Figure 1:
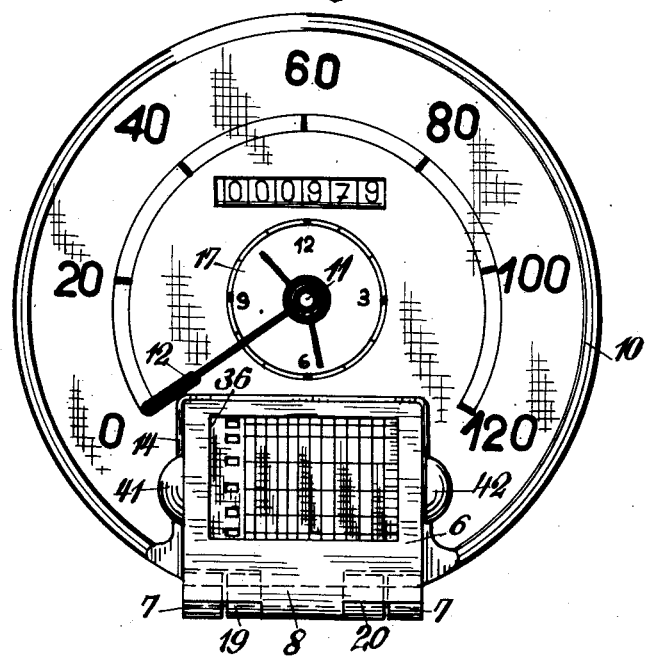

Sept. 1, 1959 A. BAUER 2,902,332
DEVICES FOR INDICATING AND RECORDING THE
SPEED OF TRAVEL OF AND THE DISTANCE
TRAVELLED BY MOTOR VEHICLES
Filed Feb. 27, 1957 3 Sheets-Sheet 1

INVENTOR.
Alfons Bauer
BY Michael S. Striker
agt.

Sept. 1, 1959 A. BAUER 2,902,332
DEVICES FOR INDICATING AND RECORDING THE
SPEED OF TRAVEL OF AND THE DISTANCE
TRAVELLED BY MOTOR VEHICLES
Filed Feb. 27, 1957 3 Sheets-Sheet 2

INVENTOR.
Alfons Bauer
BY Michael S. Striker
agt.

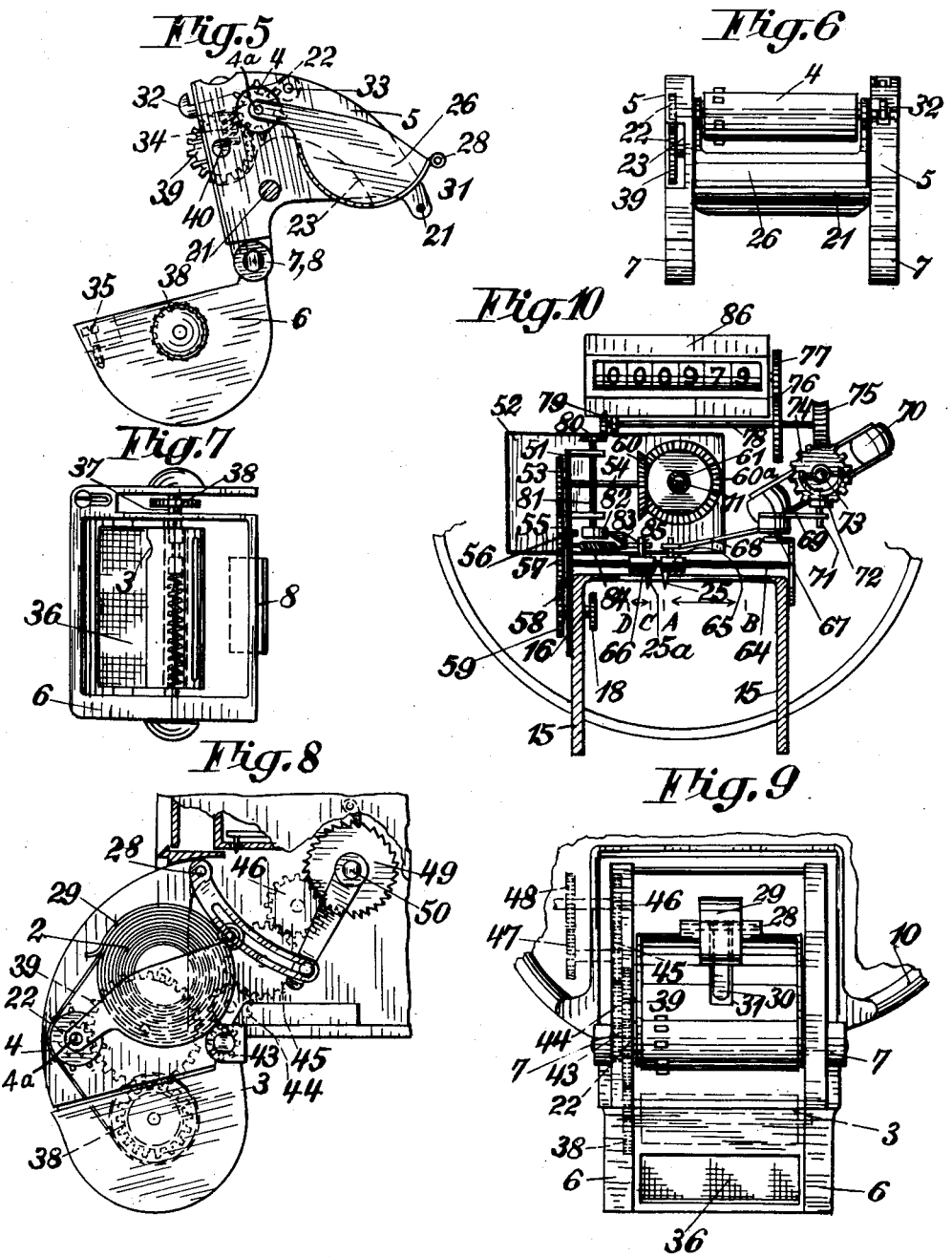

United States Patent Office 2,902,332
Patented Sept. 1, 1959

2,902,332

DEVICES FOR INDICATING AND RECORDING THE SPEED OF TRAVEL OF AND THE DISTANCE TRAVELLED BY MOTOR VEHICLES

Alfons Bauer, Salzburg, Austria

Application February 27, 1957, Serial No. 642,730

Claims priority, application Austria March 2, 1956

3 Claims. (Cl. 346—136)

Devices for indicating and recording the speed of travel of and the distance travelled by motor vehicles are known, in which a first casing compartment, contains the indicating device controlling a pointer and a recording lever as well as the clockwork for the tape drive, and a second casing compartment, which is separated from the first by a partition, contains a block which carries the tape drive and the recording tape and which can be swung out about a shaft which is parallel to the drive roll and the winding spool for the record carrier and is carried in the front wall of the casing. In that known device the casing is divided for the purpose by a vertical partition into two compartments of equal height and depth; in one casing compartment the tachometer and the clockwork driving the tape drive are carried one over the other; the other casing compartment contains the tape drive with a tape supply roll, winding drum and drive roll so that the record carrier fed from the bottom upwardly and back faces the casing front wall in its entire width. Due to this separate arrangement of the instruments and of the tape drive a device is provided which being very bulky can be installed only with difficulty and which could in no case comply with the present technical requirements. It has not been possible in any of the known devices to achieve an accurately guided movement of the tape because either the feed movement of the tape or the lateral guidance of the record carrier lacked the desired precision.

In order to avoid the disadvantages of the known devices of that type for indicating and recording the speed of travel and the distance travelled the invention is based on the idea to incorporate in a tachometer, which is intended for passenger cars and incorporated in the dashboard of the vehicle, additionally a tape drive together with a recording tape by means of a block in a compartment which is left free in the existing casing space, which block can be swung out of the casing, the arrangement being such that the front wall of the block lies in the front surface partly occupied by the circular scale of the tachometer or forms a part of said surface and ensures a high precision in the tape movement.

According to the invention that idea is realized thereby that the winding spool, the recording and drive roll and the paper tape roll are carried parallel and one behind the other in the direction of the depth of the casing in the block and that the front opening casing compartment which receives said block lies within the front surface enclosed by the casing of the indicating device but is spaced from the pointer shaft and the gear wheels for driving the recording and drive roll and of the winding spool are countersunk in one of the block walls.

This arrangement and construction of the block which can be swung out of the casing enables a reduction of the internal height of the casing compartment for the tape drive almost to the diameter of a full paper tape roll.

The space-saving effect of the construction can be further increased in that in a development of the invention the block can be swung into the casing compartment only with the part of the block which contains the paper tape roll and the recording and drive roll whereas the part of the block which contains the winding spool protrudes out of the casing front wall and when the block is swung in it is covered by a cap formed with a window, whereas said part enables the exchange of the winding spool when the block has been swung out.

Figure 3:
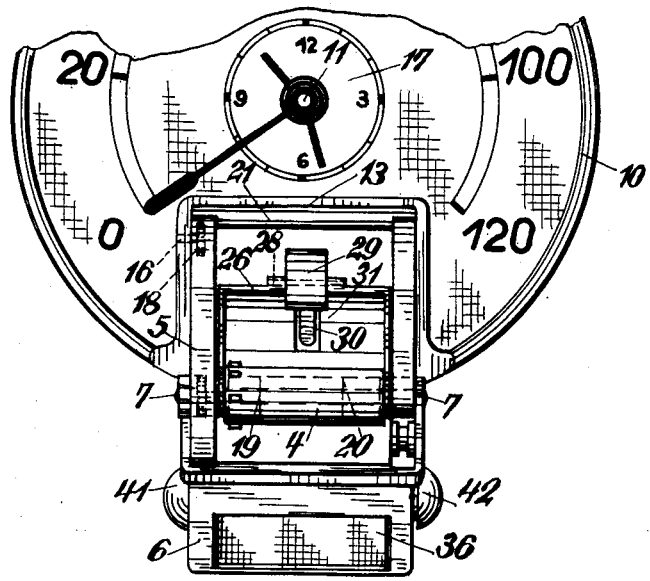
Figure 2:
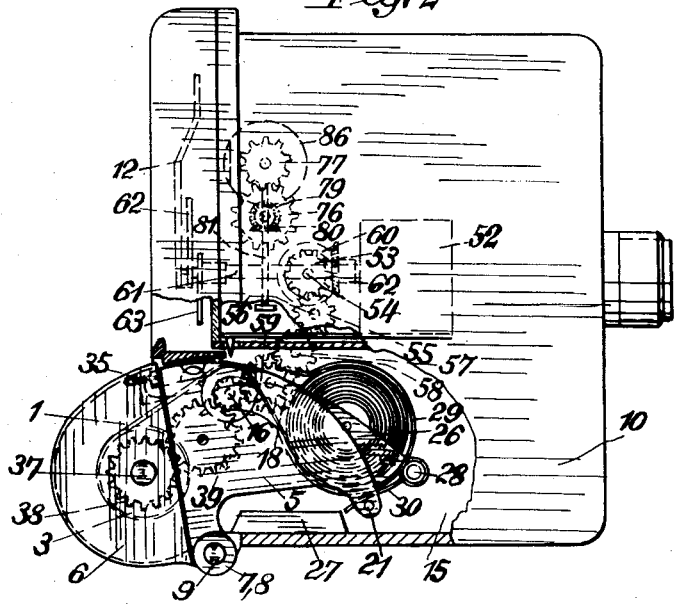
Figure 4:
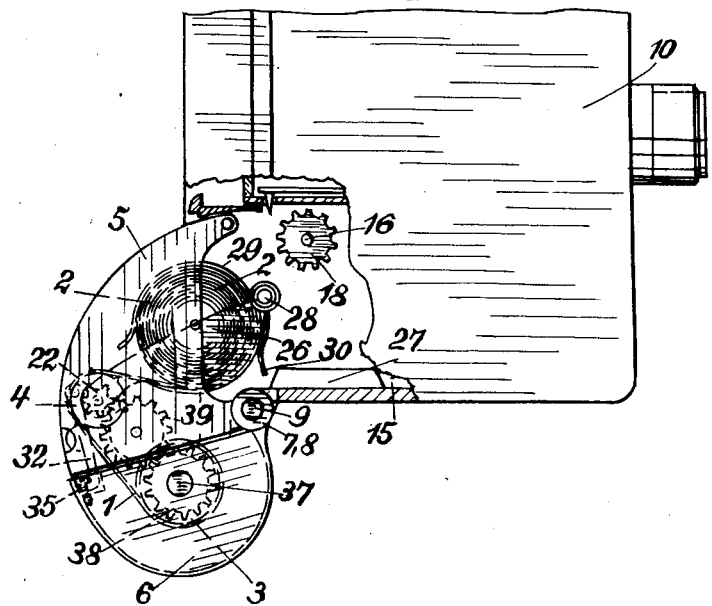

The drawing shows by way of example several illustrative embodiments of an indicating and recording device constructed according to the invention. Fig. 1 is a front view of the first embodiment of the device with a recording device in operating position. Fig. 2 is a vertical longitudinal sectional view of the device shown in Fig. 2. Fig. 3 is a front view showing the device with the feeding device swung out. Fig. 4 is a vertical sectional view of the device of Fig. 3. In Fig. 5 both parts of the blocks are shown in side views in various positions of its pivotal movement. Fig. 6 is an end view of the rear block part provided with the tape guide and Fig. 7 is a plan view of the caplike part of the block. A tape drive, whose gear wheels drive the drive roll as well as the winding roll by means of the pivot of the block parts of the tape drive, is apparent from Figs. 8 and 9 in a side view and, with the cap swung out, in a front view. Fig. 10 is a diagrammatic showing of the recording members and the clockwork.

According to the first embodiment of the invention shown in Figs. 1 to 7, the recording tape 1 which consists, e.g., of a paper tape of special quality and of foil thickness, in the form of a paper tape roll 2, its winding spool 3 and a toothed drum which is as wide as the tape and serves as a driving and recording roll 4, are carried in a casing block, which consists, e.g., of two separate block parts 5, 6, which can be coupled together and each of which is carried by means of bearing eyes 7 and 8 on a common shaft 9 for free pivotal movement and can be swung about said shaft into a casing compartment 15 of the casing 10 of the indicating device either alone or together with the other part of the block.

The casing 10 of the indicating device has in its front surface an opening 13, e.g., of rectangular shape, at a radial distance from the shaft 11 of the pointer 12 of the tachometer. Said opening is surrounded by a frame 14, which is adjoined by the compartment 15 occupying the entire depth of the casing 10. One side wall of that compartment 15 is formed with a bore, through which the end of a shaft 16 extends freely rotatably into the compartment 15. That shaft 16 does not belong to the shown drive mechanism of the clock, whose hands and dial 17 are apparent in Fig. 1. The shaft 16 has affixed to its free end a gear wheel 18, which is freely disposed in the casing compartment 15 at a very small distance from the compartment wall.

The frame 14 is adjoined at the bottom by two bearing eyes 19, 20, which protrude radially from the round casing shell 10 and in which the pivot shaft 9 for the two block parts 5, 6 of the tape drives 2, 3, 4 is affixed parallel to the plane of the front wall of the casing 10.

The block part 5 consists of two plates which are, e.g., 5 mm. thick and are spaced by a precisely determined distance and connected to form a unit by spacer bolts 21. These plates can be swung with a slight clearance into the casing compartment 15. They are formed at mutually opposite points with bores for the necks 4a of the driving and recording roll 4, whose length corresponds precisely to the width of the recording tape 1 and which has at its periphery a rim of teeth in mesh with a corresponding perforation of the record carrier 1. The necks 4a of said recording and drive roll 4 are freely rotatably carried in the bores of the plates. The roll 4 is rotated by a pinion 22, which is affixed to one neck 4a of the roll 4 and is entirely countersunk in a special recess 23 on the outside surface of one of the plates. This recess 23 is shaped so that the plate moves freely past the gear wheel 18 of the drive mechanism, which gear wheel is disposed in the casing compartment 15; thus the two plates 5 can be swung about the pivot 9. When the block part 5 has been swung in, the gear wheels 18 and 22 of the drive mechanism and of the drive roll 4 interengage (Fig. 2) and the latter lies exactly in register with a slot 24 in the top of the compartment. The recording members 25 of the indicating device extend through said slots for recording purposes. At this point the record carrier 1 is snugly in engagement with the roll periphery, which thus serves as a backing for the tape during recording and ensures an accurate recording of the speed of travel and of the distance travelled in the form of curves by means of the recording members 25. A troughlike tape guide 26 for the paper roll 2 is carried between the plates of the block part 5 on the necks 4a of the drive roll 4 for pivotal movement in a vertical direction. This tape guide is movable between the plates of the block parallel thereto with the slightest play and rests at its lower end on the guide 27 of the compartment bottom. Furthermore, the tape guide has an internal width corresponding to the width of the recording tape 1. This tape guide 26 has an extremely important function for an exact recording, namely, to guide the record carrier 1 on the calibrated track from the supply spool 2 to the drive roll 4. This is effected by the side walls of the trough, which are pivoted with their ends on the necks 4a. The full paper roll 2 lies on the rim of the trough without axial play and is held down by a flap 29, which is hinged on the horizontal shaft 28 parallel to the paper roll 2. This flap 29 is resiliently urged by a spring against the paper roll 2 and consists of a two-armed lever, whose second lever arm 30 is spaced from the outside wall of the trough in the operative position of the flap 29. When the flap 29 has been swung upwardly, however, that lever extends from below through an opening 31 in the trough wall to eject the empty paper sleeve out of the tape guide 26. This mode of supporting the paper roll 2 has also the purpose of keeping the compartment 15 as low as possible so that it does not occupy an excessively large part of the casing space of the indicating device. When the block 5 is being swung out of the compartment space 15 the tape guide 26 is moved with it to slide along the guide 27 until it slides down from the end edge of the latter and finds a support on the bearing eyes 7, 8 (Fig. 4). When the block part 5 is being swung back the tape guide 26 climbs automatically on its fixed guide 27 and slides on the same back to its operative position shown in Fig. 2.

The second block part 6 consists of a cap, which is substantially semicircular in cross-section and has flat side walls parallel to the plates of the other block part 5. This cap 6 has an end face which surrounds the cavity of the cap like a frame and can snugly engage the end faces of the plates of the other block part 5. The cap 6 can be coupled to that block part 5, e.g., by a latch 32, which is carried in the block part 5 and can be lifted out of engagement. Thus the two block parts 5, 6 are connected to form a unit. The latch 32 is carried for movement parallel to one plate of the block part 5 about a pin 33 in a slot of said plate and is loaded by a spring 34, which tends to maintain the latch hook, which protrudes out of the end face of the plate and is hooked behind a stop 35 of the caplike other block part 6, in its position of engagement. The stop 35 consists of the head of a cap screw, which is screwed into the end face of one side wall of the cap 6. The head of said screw is entirely countersunk in a recess of the side wall and can be adjusted by turning the screw to ensure an exact, clearance free engagement between the end faces of the two block parts 5, 6. Moreover, the cap 6 provides a dust-tight closure of the compartment opening 13 when the block 5, 6 has been swung in and exposes through a window 36, which corresponds to the width of the record carrier 1, a record-carrying part of the latter, which has already reached the winding spool 3. The shaft of that winding spool 3 is carried in slots in the side walls of the cap in such a manner that one end of the shaft, being provided with a coupling claw, can be separated against the pressure of a spring from the other coupling part provided at the end of a shaft stub 37 so that the spool 3 can be removed from the cap 6. The short shaft stub 37 is carried in a slotted side wall and carries a gear wheel 38, by which the winding spool 3 is driven. When the block parts 5, 6 are coupled together, this gear wheel 38 meshes with a second gear wheel 39, which is rotatably carried by the pin 40 in a slot of the plate of the block part 5 and is in permanent engagement with the gear wheel 22 of the drive and recording roll 4. Thus it is achieved that a single gear wheel 18 of the drive mechanism can drive not only the drive roll 4, by means of the gear wheel 22, but also the winding spool 3, by means of the gear wheels 38, 39. All gear wheels 22, 38 and 39 may be fixed in their respective position by a pawl, which will engage the gear wheel 22 under spring pressure immediately after the latter has been separated from the gear wheel 18. Thus all parts 3, 4 of the tape drive and the record carrier 1 itself will remain in position and can be checked while the block 5, 6 is being moved or in its disengaged position.

The recording device has the following mode of operation: It may be assumed that the paper roll 2 has been used up and the record carrier 1 is almost completely wound up on the winding spool 3. Then the block 5, 6 is gripped with two fingers at the knobs at the front and is swung entirely out of the compartment 15 of the casing 10 of the indicating device. Now the flap 29 is swung upwardly against the resilient force of its loading spring to such an extent that its second lever arm 30 throws the empty paper roll 2 out of the tape guide 26. When the flap 29 has been lifted a new, full paper roll 2 may now be inserted so that the front end of the tape can be pulled out of the bottom of the trough and can be applied over the drive roll 4 so as to embrace about one fourth of the periphery of the roll and the sprocket teeth can precisely enter the perforation holes of the record carrier 1 which is held on its track. The new paper roll 2 is now held down by the spring-loaded flap 29; then the block part 5 can be swung back into the casing compartment 15. Previously the latch 32 is to be operated to separate the block part 6 from the block part 5 so that the winding spool 3 is accessible after the block part 5 has been swung into the compartment 15. As is known in connection with film spools the winding spool 3 is lifted against the action of a spring out of the cap space and is replaced by an empty winding spool 3. Each winding spool 3 is rotatable on its shaft against the action of a spring, whereby it can be stressed. When the end of the recording tape 1 is stuck into the slot of the winding spool 3 and then the latter is released while the gear wheel 38 is held fast, the spool 3 will tighten the record carrier 1 so that the latter is stretched from the paper roll 2 via the drive roll 4 to the winding spool 3, which will maintain that tension also when the block part 6 is then swung in. The correct position of the record carrier 1 on its track can be observed through the window 36 of the cap. When the block part 6 has been swung in the hook of the latch 32 it engages behind the stop 35 to hold both block parts 5 and 6 together as a unit. Thus the gear wheels 38 and 39 remain also in engagement. The feeding of the record carrier 1 is effected by means of the gear wheel 18 of the drive mechanism in accordance with the clock time at a uniform rate, either in steps or continuously, depending on the nature of the drive mechanism. The two recording members 25 extending through the slot 24 of the compartment top will record the distance travelled and the speed of travel in the form of curves on the record carrier 1, which will thus show in juxtaposition the length of the distance travelled in a certain period of travel as well as the various phases of the travelling speed. The record carrier has a length which is sufficient for recording during a week. The drive mechanism of the drive roll 4 consists either of a spring drive or an electric motor, which has preferably a running time of seven days or is permanently fed by a battery.

It is obvious that the block 5, 6 which can be swung out can be locked by a lock carried in the casing 10 of the indicating device against unauthorized swing-out. One of the two knobs 41 and 42 of the block part 6 may serve as a push button for releasing a resilient lock (not shown), which holds both block parts in their swung-in position in the casing 10. In the first embodiment the gear wheels 18 and 22 are either caused to engage or separate from each other by the pivotal movement of the block 5, 6. The rotation of the drive roll 4 is transmitted through the intermediary of the idler wheel 39 to the gear wheel 38 and only by the latter to the winding spool 3. For this reason the winding spool 3 must be coupled by a friction clutch to its gear wheel 38 to compensate the differences of feed length resulting from the increasing spool diameter.

For certain reasons it may prove desirable to maintain the connection of the drive to the drive roll 4 and the winding spool 3 also while the block 5, 6 is being moved and in its disengaged position. Such an embodiment is illustrated in Figs. 8 and 9. The previously described elements of the tape drive are the same with the exception of the gear elements; for this reason they have the same reference characters as in the first embodiment. Fig. 8 shows that a gear wheel 43 having a double tooth width and carried on the pivot 9 is freely rotatably disposed in the eye 7. That gear wheel is in mesh with the large gear wheel 39, which is rotatably carried by means of the pin 40 in the block part 5 and which is in mesh with the gear 22 of the drive roll 4 and with the gear wheel 38 of the winding roll 3 and turns both elements of the tape drive at the same time when the pinion 43 freely rotatable on the pivot 9 is driven by the clockwork by means of several gear wheels 44 to 50. Thus the gear wheel 43 ensures an uninterrupted transmission of the drive movement to the tape drive.

The tape guide 26 may be omitted. In that case the block 5 itself is formed as a tape guide.

Following the description of the invention those gear elements, known per se, of the indicating device and the clockwork, which connect the clockwork to the gear wheel 18 of the drive roll 4 and actuate the two recording members will be described hereinafter with reference to Fig. 10.

The connection between the clockwork 52 and the gear wheel 18 which is rotatably carried in the plate 51 and can be coupled to the gear wheel 22 of the drive roll 4 is established by a set of gear wheels 53, 55, 57, 59, which are carried on pins 54, 56, 58 and 16 in the plate 51 and mesh with each other. The gear wheel 53 is connected by the shaft 54 to a bevel wheel 60, which meshes with a bevel wheel 60a affixed to the hollow arbor 61 of the minute hand 62. Being freely rotatably mounted on the arbor 11 of the pointer 12 of the indicating device the hollow arbor 61 will move the pointers 62 and 60a in the rhythm of time independently of the arbor 11. Thus the clockwork drives by means of the gear wheels 63, 60, 54 to 59 and 18 also the gear wheel 22 and with it the drive roll 4 in the rhythm of time.

The recording member 25 for recording the speed of travel and the recording member 25a for recording the distance travelled are movable each by a slide member 65 or 66, which may be slidable, e.g., on a rod 64 carried by the casing 10 and extending therein transversely to the recording tape 1. Each of the two recording members consists of a steel spring, whose tip rests under slight resilient stress on the periphery of the drive roll 4 and whose other end is rigidly affixed to the respective slide member 65 or 66. The recording member 25 for speed recording is moved in the range A—B by a bell-crank lever 68, 69 which is pivoted on the shaft 67. The second arm of the bell-crank lever 69 engages, e.g., by means of a fork the pin 71 of a slide 72 moved along a straight line by the governor 70. The governor 70 is driven in a known manner by a vehicle wheel by means of a flexible shaft and depending on the throw of its weights the governor will move the slide 72, the bell-crank lever 68, 69 and finally the recording member 25 to record a curve line which corresponds to the speed at any time. At the same time the rotation of the governor shaft 73 is transmitted by a worm gear 74, 75 and the gear wheels 76, 77 to the digit rolls of an odometer 86, which indicates the distance travelled in kilometers. At the same time the worm wheels 74, 75 drive by means of the shaft 78 the bevel wheels 79, 80. The bevel wheel 80 is connected by the shaft 81 to a cam 82, the rotation of which causes a one-armed lever 83 to oscillate against the action of a spring 84. That lever 83 has fork engaging the pin 85 of the slide member 66 of the recording member 25a for recording the distance travelled. That recording member 25a is oscillated along the cam 82, once from C to D for a distance of, e.g., 500 meters and then back from D to C for the same distance so that a zig-zag line is recorded on the record carrier per kilometer travelled.

In all embodiments shown the compact construction of the entire device is retained. All disclosed embodiments of the invention may be varied as desired within the scope of the inward and outward movement of the block 5, 6 on its wide side. For instance, the entire block 5, 6 may appear in the front view also over the pointer shaft 11 of the indicating device, if desired, the arcuate speed dial being arranged below it, whereas the clock remains at the centre.

I claim:

1. In a device for indicating and recording information such as the speed of a vehicle and the distance travelled thereby, in combination, casing means having a front wall formed with an opening communicating with a compartment in the interior of said casing means; support means, said casing means turnably carrying said support means for movement about a predetermined axis through said opening of said front wall between an inner position where an inner part of said support means is located in said compartment and an outer part of said support means is located at the exterior of said casing means and closes said opening of said front wall, and an outer position where said outer and inner parts of said support means are both located at the exterior of said casing means; means connecting said outer part of said support means to said inner part thereof for turning movement with respect to said inner part so that said inner part of said support means may remain in said compartment while said outer part of said support means is turnable away from said inner part of said support means; a tape supply roll, a tape drive roll and means at said inner part of said support means turnably carrying said rolls; and a tape take-up roll and means at said outer part of said support means turnably carrying the latter roll, said drive roll being located, when said support means is in its inner position, rearwardly of said take-up roll and forwardly of said supply roll, and said outer part of said support means being turnable away from said inner part to increase the distance between said take-up roll and said drive roll so that the latter two rolls are freely accessible.

2. In a device for indicating and recording information such as the speed of a vehicle and the distance travelled thereby, in combination, casing means having a front wall formed with an opening communicating with a compartment in the interior of said casing means; support means, said casing means turnably carrying said support means for movement about a predetermined axis through said opening of said front wall between an inner position where an inner part of said support means is located in said compartment and an outer part of said support means is located at the exterior of said casing means and closes said opening of said front wall, and an outer position where said outer and inner parts of said support means are both located at the exterior of said casing means; means connecting said outer part of said support means to said inner part thereof for turning movement with respect to said inner part so that said inner part of said support means may remain in said compartment while said outer part of said support means is turnable away from said inner part of said support means; a tape supply roll, a tape drive roll and means at said inner part of said support means turnably carrying said rolls; a tape take-up roll and means at said outer part of said support means turnably carrying the latter roll, said drive roll being located, when said support means is in its inner position, rearwardly of said take-up roll and forwardly of said supply roll, and said outer part of said support means being turnable away from said inner part to increase the distance between said take-up roll and said drive roll so that the latter two rolls are freely accessible; first drive means carried by said inner part of said support means and cooperating with said drive roll for driving the same; and second drive means carried by said outer part of said support means and cooperating with said take-up roll for driving the latter.

3. In a device for indicating and recording information such as the speed of a vehicle and the distance travelled thereby, in combination, casing means having a front wall formed with an opening communicating with a compartment in the interior of said casing means; support means, said casing means turnably carrying said support means for movement about a predetermined axis through said opening of said front wall between an inner position where an inner part of said support means is located in said compartment and an outer part of said support means is located at the exterior of said casing means and closes said opening of said front wall, and an outer position where said outer and inner parts of said support means are both located at the exterior of said casing means; means forming a pivotal connection between said parts of said support means and connecting said outer part of said support means to said inner part thereof for turning movement with respect to said inner part so that said inner part of said support means may remain in said compartment while said outer part of said support means is turnable away from said inner part of said support means; a tape supply roll, a tape drive roll and means at said inner part of said support means turnably carrying said rolls; a tape take-up roll and means at said outer part of said support means turnably carrying the latter roll, said drive roll being located, when said support means is in its inner position, rearwardly of said take-up roll and forwardly of said supply roll, and said outer part of said support means being turnable away from said inner part to increase the distance between said take-up roll and said drive roll so that the latter two rolls are freely accessible; first drive means carried by said inner part of said support means and cooperating with said drive roll for driving the same; second drive means carried by said outer part of said support means and cooperating with said take-up roll for driving the latter; and a gear turnably carried by said support means coaxially with the turning axis at the pivotal connection between said parts of said support means, said gear cooperating with said first and second drive means for transmitting a drive therebetween at all positions of said parts of said support means with respect to each other.

References Cited in the file of this patent

UNITED STATES PATENTS

| | | |
|---|---|---|
| 1,347,676 | Bowdish | July 27, 1920 |
| 2,321,273 | Belcher | June 8, 1943 |
| 2,341,118 | Rodanet | Feb. 8, 1944 |
| 2,663,609 | Jones | Dec. 22, 1953 |